(12) United States Patent
Ye et al.

(10) Patent No.: US 12,155,702 B2
(45) Date of Patent: *Nov. 26, 2024

(54) SYSTEMS AND METHODS TO EXECUTE BRANCHING AUTOMATION SCHEMES IN A COLLABORATION ENVIRONMENT

(71) Applicant: Asana, Inc., San Francisco, CA (US)

(72) Inventors: Victoria Ye, Bellevue, WA (US); Alexander Rybak, San Francisco, CA (US); Adrian Van Yen, Saratoga, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,219

(22) Filed: Nov. 16, 2023

(65) Prior Publication Data

US 2024/0171621 A1     May 23, 2024

Related U.S. Application Data

(63) Continuation of application No. 17/990,075, filed on Nov. 18, 2022, now Pat. No. 11,863,601.

(51) Int. Cl.
    *H04L 65/402*      (2022.01)
    *H04L 12/18*      (2006.01)

(52) U.S. Cl.
    CPC ........ *H04L 65/402* (2022.05); *H04L 12/1818* (2013.01)

(58) Field of Classification Search
    CPC .......................... H04L 65/402; H04L 12/1818
    See application file for complete search history.

(56) References Cited

U.S. PATENT DOCUMENTS 11,553,045 B1    1/2023   Beauchamp
2008/0147453 A1   6/2008   Kogan
(Continued)

FOREIGN PATENT DOCUMENTS

CN     106330864 A     1/2017
CN     108287786 A     7/2018

OTHER PUBLICATIONS

Kerstin S. Haring, "FFAB-The Form Function Attribution Bias in Human-Robot Interaction." 2018, IEEE Transactions on Cognitive and Developmental Systems, vol. 10, No. 4, pp. 841-851. (Year: 2018).

(Continued)

*Primary Examiner* — Michael A Keller
(74) *Attorney, Agent, or Firm* — Esplin & Associates, PC

(57) ABSTRACT

Systems and methods configured to execute branching automation schemes in a collaboration environment are disclosed. Exemplary implementations may: manage environment state information maintaining a collaboration environment; manage automation records of the collaboration environment, the automation records defining trigger events, branching criteria, and sets of automated actions to carry out in the collaboration environment in response to occurrence of the trigger events and satisfaction of individual ones of the branching criteria; responsive to the detection of the occurrence of individual trigger events and the satisfaction of the individual ones of the branching criteria, effectuate individual ones of the sets of automated actions within the collaboration environment, and/or perform other operations.

20 Claims, 4 Drawing Sheets

(56) References Cited

U.S. PATENT DOCUMENTS

| | | |
|---|---|---|
| 2009/0077422 A1 | 3/2009 | Khaladkar |
| 2011/0225293 A1* | 9/2011 | Rathod |
| 2020/0074369 A1* | 3/2020 | Arcolano ................. G06F 8/71 |
| 2020/0265145 A1* | 8/2020 | Slabyak .................... G06F 8/70 |
| 2022/0245563 A1 | 8/2022 | Schmidt |
| 2023/0076595 A1 | 3/2023 | Baselga |
| 2023/0105550 A1 | 4/2023 | Beauchamp |

OTHER PUBLICATIONS

Ghiani et al., Personalization of Context-Dependent Applications Through Trigger-Action Rules, ACM Transactions on Computer-Human Interaction vol. 24 Issue 2 Article No. 14 pp. 1-33 (Year: 2017).

Sheth, A., Kochut, K.J., Workflow Applications to Research Agenda: Scalable and Dynamic Work Coordination and Collaboration Systems. In: Doga-, A., Kalinichenko, L., Ozsu, M.T., Sheth, A. (eds) Workflow Management Systems and Interoperability. Nato ASI Series, vol. 164. (Year: 1998).

* cited by examiner

SYSTEMS AND METHODS TO EXECUTE BRANCHING AUTOMATION SCHEMES IN A COLLABORATION ENVIRONMENT

FIELD OF THE DISCLOSURE

The present disclosure relates to systems and methods to execute branching automation schemes in a collaboration environment.

BACKGROUND

Online collaboration environments, sometimes referred to as virtual collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

Hosting a web-based collaboration environment poses many challenges. For example, operating the collaboration environment may require precise ways of creation, storage, management, and/or provision of information that makes up the collaboration environment. One way that operators look to improve the operation of the collaboration environment is to improve parts of the collaboration environment involving substantial human-machine interaction. For example, traditional user interactions with a collaboration environment are heavily driven by manual interaction and manipulation of records for work managed by the collaboration environment. For example, users may monitor records of the collaboration environment to determine changes to certain records, for example, checking to see if another user has completed a task. The user may then use this to kick-off additional action on their part, for example, by creating records for follow up work that may be associated with the completed task. While the records themselves are effective in storing information about individual work, the true effectiveness of an online collaboration environment may come down to the interactivity between records such as when a status and content of an individual record impacts one or more other records. One or more implementations of the present disclosure propose a way to leverage these robust electronic records in a way that allows for branching automation schemes.

"Branching" may refer to a type of filtering mechanism which decides what automated actions should be carried out after an occurrence of a trigger event. This way, a single trigger event could result in one or more of multiple different automated actions to be carried out based on which "branch" a given scheme filters down to. While the terms "branching" and "filtering" have been described, this is for illustrative purposes only. Instead, these concepts may be accomplished through technical steps of defining a set of branching criteria, determining which of the criteria are satisfied, and then carrying out set(s) of automated actions based on the satisfaction of one or more of the criteria. An implementation of one or more features and/or functional presented herein could not be accomplished without computer-implemented automation, and the ability to interact with and access multiple electronic records instantaneously and/or simultaneously. The interactivity of electronic records leveraged by the present disclosure is something that has not, and cannot, be replicated, matched, or leveraged in the physical world. The inventors of the present disclosure have identified that any attempt to mentally retain, manage, and/or implement such branching automation schemes is simply not practically possible by the users absent computer implementation.

One aspect of the present disclosure relates to a system configured to execute branching automation schemes in a collaboration environment. A system configured to execute branching automation schemes in a collaboration environment may include one or more processors configured by machine-readable instructions. Executing the machine-readable instructions may cause the one or more processors to facilitate executing branching automation schemes in a collaboration environment.

The processor(s) may be configured to manage environment state information maintaining a collaboration environment, and/or other information. The collaboration environment may be configured to facilitate interaction by users with the collaboration environment. The environment state information may include one or more records. The one or more records may include user records, work unit records, automation records, and/or other records. The user records may include user information describing the users of the collaboration environment. The work unit records may include work unit information describing units of work managed, and/or assigned within the collaboration environment.

The processor(s) may be configured to manage the automation records of the collaboration environment. The automation records may define one or more of trigger events, branching criteria, sets of automated actions to carry out in the collaboration environment in response to occurrence of the trigger events and satisfaction of individual ones of the branching criteria, and/or other information. By way of non-limiting illustration, the automation records may include a first automation record. The first automation record may define one or more of a first trigger event, a first branching criterion, a first set of automated actions to carry out in the collaboration environment in response to occurrence of the first trigger event and satisfaction of the first branching criterion, a second branching criterion, a second set of automated actions to carry out in the collaboration environment in response to the occurrence of the first trigger event and satisfaction of the second branching criterion, and/or other information.

The processor(s) may be configured to detect, based on monitoring the environment state information, occurrence of the trigger events. By way of non-limiting illustration, an occurrence of the first trigger event may be detected.

The processor(s) may be configured to, responsive to detection of the occurrence of the trigger events, determine which of the branching criteria within the automation records are satisfied. By way of non-limiting illustration, responsive to detection of the occurrence of the first trigger event, processor(s) may be configured to determine if the first branching criterion, the second branching criterion, and/or other branching criterion of the first automation record are satisfied.

The processor(s) may be configured to, responsive to the detection of the occurrence of individual trigger events and the satisfaction of the individual ones of the branching criteria, effectuate individual ones of the sets of automated actions within the collaboration environment. By way of non-limiting illustration, responsive to the detection of the first trigger event and satisfaction of the first branching criterion, the processor(s) may be configured to effectuate the first set of automated actions within the collaboration environment. By way of non-limiting illustration, responsive to the detection of first trigger event and satisfaction of the second branching criterion, the processor(s) may be configured to effectuate the second set of automated actions within the collaboration environment. By way of non-limiting illustration, responsive to the detection of first trigger event and satisfaction of both the first branching criterion and the second branching criterion, the processor(s) may be configured to concurrently effectuate the first set of automated actions the second set of automated actions within the collaboration environment.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
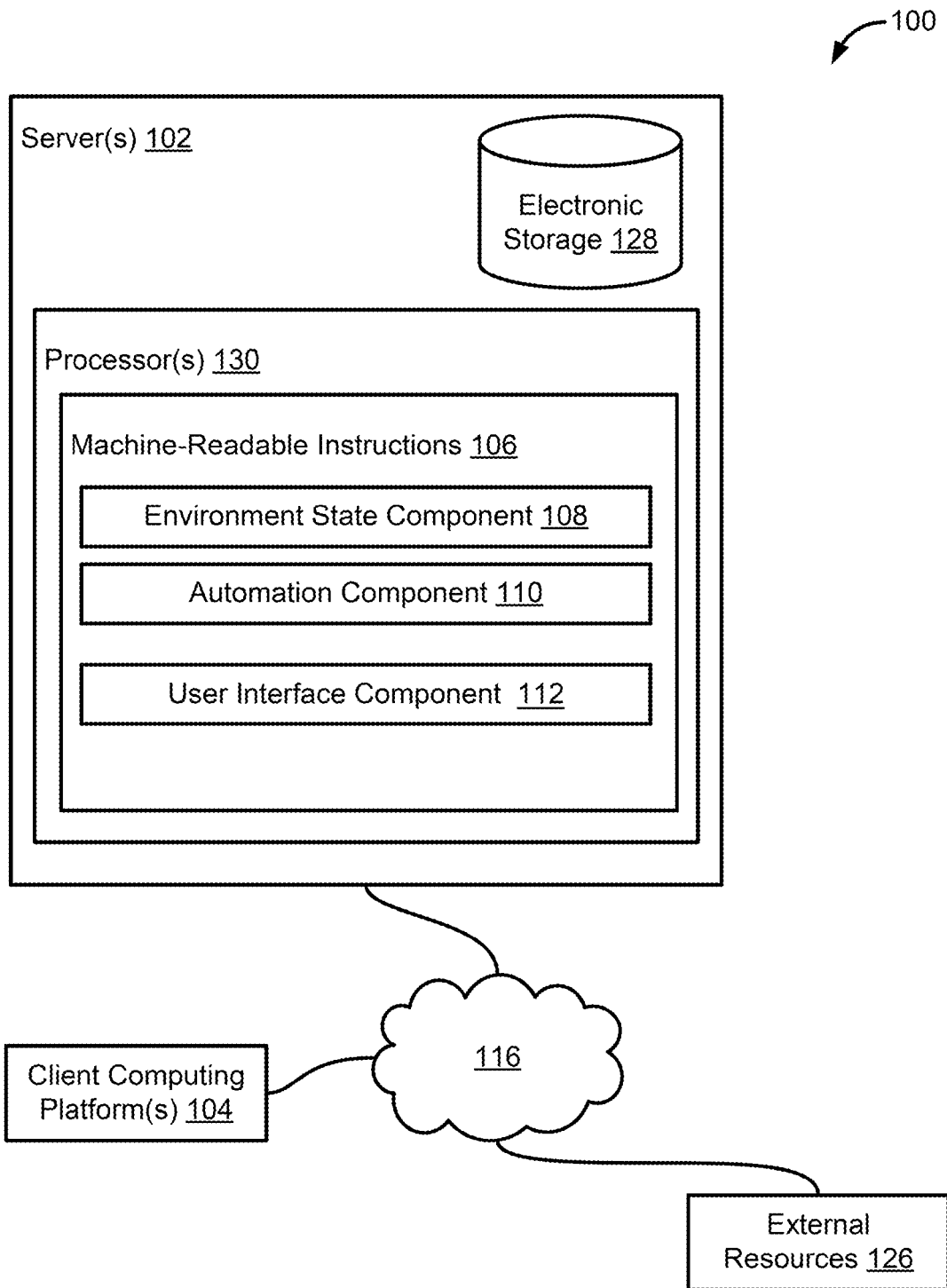
FIG. 1 illustrates a system configured to execute branching automation schemes in a collaboration environment, in accordance with one or more implementations.

FIG. 1 illustrates a system 100 configured to execute branching automation schemes in a collaboration environment, in accordance with one or more implementations. One or more implementations of the systems and methods presented herein may create less friction and/or more a more effective and efficient collaboration environment by effectuating one or more of a plurality of automatic sequences of actions in response to trigger events and satisfaction of one or more branching criterion. The actions, triggers, and/or branching criterion may be user specified.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. The client computing platform(s) 104 may be remotely located from server(s) 102. Users may access system 100 via client computing platform(s) 104 over network 116.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate executing branching automation schemes in a collaboration environment. The instruction components may include one or more of an environment state component 108, an automation component 110, a user interface component 112, and/or other instruction components.

Environment state component 108 may be configured to manage environment state information and/or other information used in maintaining a collaboration environment. The collaboration environment may be configured to facilitate interaction by users with the collaboration environment. The environment state information may include one or more records. Individual records may include values of one or more environment parameters of the collaboration environment. The one or more records may include one or more of user records, work unit records, automation records, and/or other records. The user records may include user information describing the users of the collaboration environment. The user information may include values of environment parameter comprising user parameters. The work unit records may include work unit information describing units of work assigned, created by, and/or managed within the collaboration environment. The work unit information may include values of environment parameters comprising work unit parameters. The automation records may include automation information and/or other information. The automation information may include values of environment parameters characterizing one or more of trigger events, branching criteria, and/or sets of automated actions to carry out in the collaboration environment in response to occurrence of the trigger events and satisfaction of individual ones of the branching criteria. The automation records may generally define the various branching automation schemes of the present disclosure.

Figure 4:
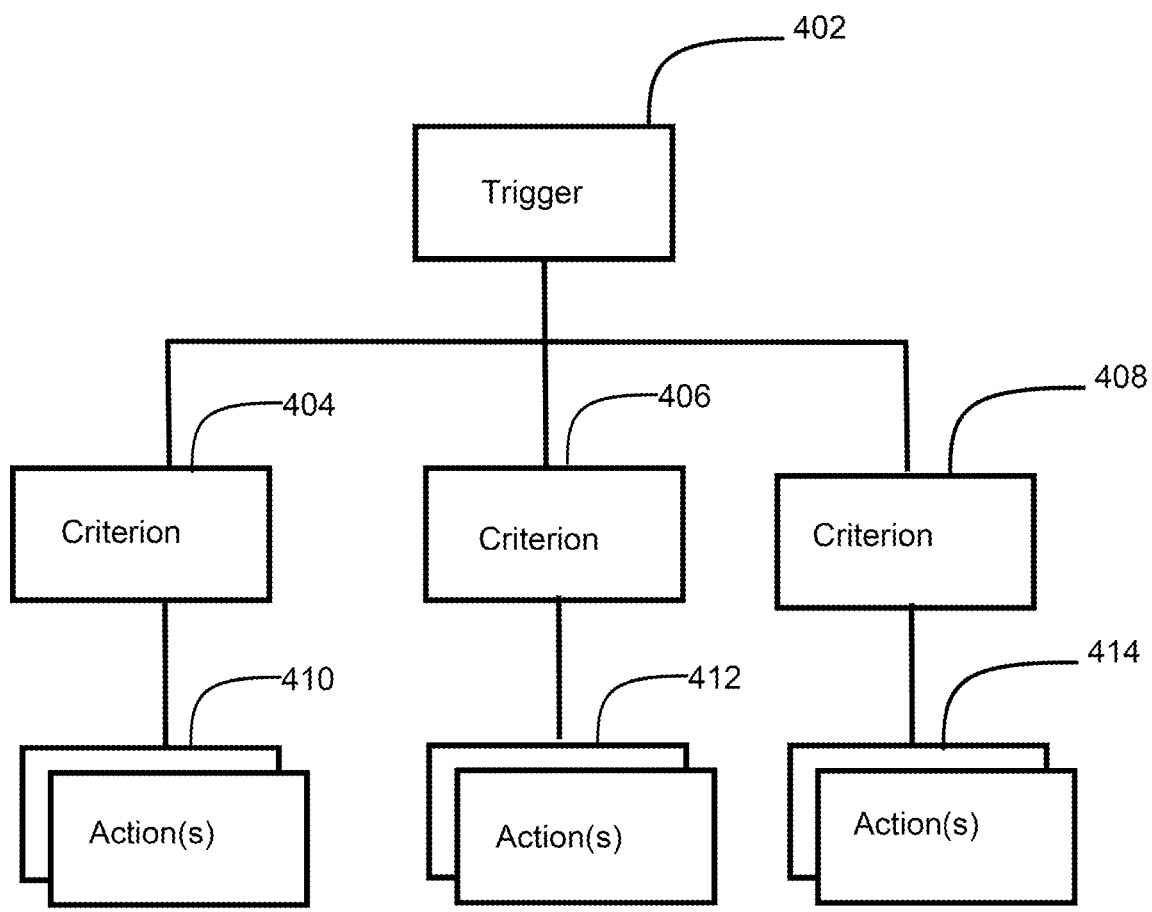
FIG. 4 illustrates a visual representation of an automation scheme, in accordance with one or more implementations.

FIG. 4 illustrates a visual representation of an automation scheme that may be defined by an automation record, in accordance with one or more implementations. In particular, the automation scheme may be defined by one or more of a trigger event 402, branching criteria (including criterion 404, criterion 406, and criterion 408), sets of automated actions (including set 410, set 412, and set 414). Individual ones of the sets of automated actions may be carried out (e.g., executed) in the collaboration environment in response to occurrence of the trigger event 402, and satisfaction of individual ones of the branching criteria. By way of non-limiting illustration, the set 410 of automated actions may be executed in response to occurrence of the trigger event 402, and satisfaction of the branching criterion 404; the set 412 of automated actions may be executed in response to occurrence of the trigger event 402, and satisfaction of the branching criterion 406; and the set 414 of automated actions may be executed in response to occurrence of the trigger event 402, and satisfaction of the branching criterion 408.

It is noted that the visual representation of an automation scheme in FIG. 4 is for illustrative purposes only and not to be considered limiting. Instead, those skilled in the art may appreciate that more or fewer criteria, trigger events, and/or automated actions may be specified, which may result in more or fewer sets of automated actions to be carried out in the collaboration environment.

Returning to FIG. 1, the user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of, and/or collaborate with one or more other users on.

Collaboration between users may include performing shared and/or cooperative actions within the collaboration environment to complete one or more of the units of work. The shared and/or cooperative actions may include one or more of communication actions, work completion actions, and/or other actions. One or more implementations of the present disclosure may be configured to leverage the fact that users may be interacting with the collaboration environment and/or each other in synchronous and/or asynchronous ways using remotely located client computing platforms. For example, a user may log into the collaboration environment and perform one or more actions and then sign out. The user may log in at a later date and notice that the collaboration environment has changed due to changes that were made by one or more other users while they were signed out. Accordingly, collaboration between users may have been occurring without any direct knowledge of other user's actions within the collaboration environment. At least some of the collaboration between users may be non-intuitive and/or not immediately knowable. Instead, one or more implementations described herein may take advantage of the existence of the work unit records that are stored and maintained by server(s) 102 which store and track user actions. From these records, collaboration may then be derived and/or determined in ways that would otherwise not be possible by the users individually and/or together.

Communication actions may include communicating within and/or outside the collaboration environment about a unit of work in an effort to advance progress toward completion of the unit of work and/or other units of work associated with the unit of work. Communicating within the collaboration environment may include one or more of adding comments to a comment thread, messaging via chat interfaces of the collaboration environment, adding comments as metadata to digital content items that are associated with a unit of work, "@" mentioning one or more users, and/or other actions. Communicating outside the collaboration environment may include one or more of communication through e-mail, generating calendar items that relate to completion of a unit of work, conducting meetings (in person and/or virtual), messaging via chat interfaces that are external to the collaboration environment, and/or other actions.

Work completion actions may include actions performed within the collaboration environment that are related to advancing progress of one or more work unit records for one or more units of work. The actions may include one or more of creating work unit records, assigning work unit records, marking units of work as complete, adding due dates to units of work, and/or other actions.

The "members" of the work unit records may include specifically named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are activity performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, and/or other units of work.

Work unit records may be created by a given user for the given user and/or created by the given user and assigned to one or more other users. Work unit records may be created by a given user for the given user and/or created by the given user and managed by one or more other users.

Individual work unit records may include and/or may be associated with one or more digital content items. An individual work unit record may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, work unit records created by, assigned to, and/or completed by the users may refer generally to a linking of the work unit records with the individual users in the collaboration environment. A work unit record may be linked with a user in a manner that defines one or more relationships between the user and the work unit record. Such a relationship may connote and/or be a result of an action (past, present, and/or future) of the user with respect to the work unit record. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by an individual record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record and/or by being subordinate to another work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may specify one or more of a unit of work name (or title), a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given work unit record is dependent on one or more other work unit records. A work unit record being dependent on an other work unit record may mean the work unit record may not be completed, started, assigned, and/or have other interactions performed in relation to the work unit record before some action is performed on the other work unit record. By way of non-limiting illustration, a work unit record may not be accessed until another work unit record is marked completed, meaning the work unit record may be dependent on the other work unit record. In some implementations, values of the dependency parameter may go hand in hand with the hierarchical information. By way of non-limiting illustration, a work unit record that is subordinate to an other work unit record may be dependent on the other work unit record, or vice versa.

The values of the work assignment parameter describing assignment of users to units of work may be determined based on one or more interactions by one or more users with a collaboration environment. In some implementations, one or more users may create and/or assign one or more work unit records to themselves and/or another user. In some implementations, a user may be assigned a unit of work and the user may effectuate a reassignment of the unit of work from the user or one or more other users.

In some implementations, values of the work completion parameter may indicate that a completion status of a work unit record has changed from "incomplete" to "marked complete" and/or "complete." In some implementations, a status of complete for a work unit record may be associated with the passing of an end date associated with the work unit record. In some implementations, a status of "marked complete" may be associated with a user providing input via the collaboration environment at the point in time the user completes the unit of work of the work unit record (which may be before or after an end date).

In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given work unit record supports (e.g., is associated with) another work unit record (e.g., a project record, an objective record, and/or other record). The values may specify one or more of a name/title of another work unit record (e.g., project, objective), a name/username of an owner of another work unit record, and/or other information.

In some implementations, managing the environment state component 108 may include maintaining queues of the work unit records assigned to the users. The queues may be presented to the users in a user interface of the collaboration environment to facilitate access to the work unit records via work unit pages. Individual queues may represent the work unit records assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., different hierarchies, groupings, etc.), and the cells within the column may be populated with visual content item representing work unit records that are associated with the sections.

In some implementations, environment state component 108 may be configured to manage information defining work unit pages (sometimes referred to simply as "pages") corresponding to the individual work unit records. Individual work unit pages may provide access to individual work unit records. Managing information and/or records may include one or more of determining, obtaining, receiving, requesting, checking, storing, modifying, and/or other operations. Managing information defining individual work unit pages may include providing information to the user interface component 112 to effectuate presentation of the work unit pages, and/or other information. In some implementations, individual work unit pages may include individual sets of interface elements displaying the values of one or more of the work unit parameters of the individual work unit records.

Users may access work unit records via the work unit pages by viewing, adding, changing, deleting, and/or otherwise interacting with values of work unit parameters stored by the work unit records. In some implementations, work unit pages providing access to task records may be referred to as task pages; work unit pages providing access to project records may be referred to as project pages; and work unit pages providing access to objective records may be referred to as objective pages. In some implementations, user pages may include views of the collaboration environment that provide access to user records.

In some implementations, work unit records may define tasks. Tasks may include to-do items and/or action items one or more users should accomplish and/or plan on accomplishing in order to complete a task. The work unit information that defines tasks may be referred to as task information and/or other information. Task information may include values of work unit parameters for tasks managed within the collaboration environment. The work unit parameters for tasks may be referred to as "task parameters." The work unit parameters comprising tasks parameters may be specific to tasks and/or may include one or more parameters not shared with projects, objectives, and/or other records. The task parameters may characterize one or more tasks created, assigned, and/or managed within the collaboration environment and/or via the collaboration environment, and/or the metadata associated with the one or more tasks.

In some implementations, work unit records may define projects. The work unit information that defines projects may be referred to as project information and/or other information. Project information may include values of work unit parameters for projects managed within the collaboration environment. The work unit parameters for projects may be referred to as "project parameters." The work unit parameters comprising project parameters may be specific to project records and may include one or more parameters not shared with tasks, objectives, and/or other records. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may be associated with one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. The work unit information defining objectives may be referred to as objective information. The objective information may include values of one or more work unit parameters that define the objectives. The values of the work unit parameters may be organized in objective records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objectives may be associated with a set of units of work assigned to a user that may indirectly (and/or directly) facilitate progress toward fulfillment of the user objectives.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The automation component 110 may be configured to generate and/or manage automation records. The automation records may include automation information and/or other information. The automation information may be generated based on user entry and/or selection of the automation information into a user interface (see, e.g., user interface component 112 and/or FIG. 3). The automation information of the automation records may define one or more of trigger events, branching criteria, sets of automated actions to carry out in the collaboration environment in response to occurrence of the trigger events and satisfaction of individual ones of the branching criteria, and/or other information. The user entry and/or selection of automation information may include entry and/or selection of one or more of individual automated actions, individual trigger events, individual branching criterion, and/or other information.

In some implementations, individual actions of the automation records may be defined by a target component, an action component, and/or other information. The target component of an action may include the environment parameter (or parameters) to which the action is to be carried out on. The action component of an action may define what change is to be made on the value of the environment parameter (or parameters) defined by the target component.

In some implementations, individual trigger events may be defined by a source component, an event component, and/or other information. The source component of a trigger event may include the environment parameter (or parameters) from which occurrences of a trigger event may be derived. The event component may include the value (or change in the value) for the environment parameter (or parameters) defined by the source component from which occurrences of a trigger event may be derived.

Individual branching criterion may be defined by a source component, a satisfaction component, and/or other information. The source component of a branching criterion may include the environment parameter (or parameters) from which satisfaction of the branching criterion may be derived. The satisfaction component may include the value (or change in the value) for the environment parameter (or parameters) defined by the source component from which satisfaction is derived. Satisfaction may mean that the value of the environment parameter has the value (or has completed the change in the value) defined by the satisfaction component of the branching criterion.

In some implementations, the environment parameter (or parameters) from which satisfaction of the branching criterion may be derived may be associated with a subset of the work unit information (e.g., a subset of the work unit parameters) in one or more of the work unit records. By way of non-limiting illustration, the subset of the work unit information may include one or more of user designations within the work unit records, work type of the units of work, custom fields, and/or other information.

The user designations within the work unit records may include one or more of assignee designations (e.g., assignee parameter), owner designations (e.g., owner parameter), creator designations (e.g., creator parameter), manager designations (e.g., manager parameter), member designations (e.g., member parameter), and/or other information.

Work types of units of work may refer to work designated to different departments, and/or to users of different roles. Departments may include one or more of design, legal, engineering, management, and/or other department designations. Users in a given department may be assigned units of work of a given work type. By way of non-limiting illustration, the work unit records defining units of work assigned to users in a design department may generally be classified as "design type" units of work; whereas the work unit records defining units of work assigned to users in a legal department may generally be classified as "legal type" units of work. Users of a given role be assigned units of work of a given work type. By way of non-limiting illustration, the work unit records defining units of work assigned to users in a management role may generally be classified as "management type" units of work; whereas the work unit records defining units of work assigned to users in an intern role may generally be classified as "intern type" units of work.

Custom fields may include values for custom parameters, and/or custom values for existing ones of the work unit parameters. Custom fields may be defined by a user and/or system administrator.

In some implementations, individual branching criterion may be specified in relation to time. For example, certain temporal designations may be placed on branching criterion. That is, the values, or change in values defined by a branching criterion may have a time restriction or designation placed on it. By way of non-limiting illustration, a branching criterion may be associated with a parameter having one or more of a value (or experiencing a value change) by given date and/or time, a value (or experiencing a value change) within a date and/or time range, a value (or experiencing a value change) after a passage of a specified amount of time following some reference point in time, and/or other time-based characteristic. For example, a criterion may be "task was assigned between 8:00 pm and 12:00 am," so that the criterion may be associated with not only the assignment parameter, but also when an assignment was made.

By way of non-limiting illustration, the automation records may include a first automation record. The first automation record may define one or more of a first trigger event, a first branching criterion, a first set of automated actions to carry out in the collaboration environment in response to occurrence of the first trigger event and satisfaction of the first branching criterion, a second branching criterion, a second set of automated actions to carry out in the collaboration environment in response to the occurrence of the first trigger event and satisfaction of the second branching criterion, and/or other information. The occurrence of the first trigger event and satisfaction of the first branching criterion may generally refer to a first "branch" of an automation scheme created by the first automation record. The occurrence of the first trigger event and satisfaction of the second branching criterion may generally refer to a second "branch" of the automation scheme created by the first automation record.

The automation component 110 may be configured to detect occurrence of the trigger events. The occurrence of the trigger events may be detected based on changes in values of one or more of the environment parameters of one or more records, and/or other information. Detection may be based on monitoring environment state information, user actions at the remotely located client computing platform(s) 104, and/or other components of system 100. In some implementations, automation component 110 may be configured to monitor the environment state information managed by environment state component 108 to detect changes in the environment state information resulting from interaction by the users with the collaboration environment through the instances of the user interface.

By way of non-limiting illustration, an occurrence of the first trigger event may be detected. The first trigger event may be detected based on a first change in a first value of a first environment parameter of a first record to a second value, and/or other information. By way of non-limiting illustration, the first environment parameter may include a work completion parameter, the first value may be "incomplete," and the second value may be "completed."

In some implementations, individual trigger events may be specified as individual occurrences of change of the values of the environment parameters. Occurrences of change may convey a state change of an environment parameter. The state change may not consider what the change is, but instead that a change occurred. For example, a trigger event may include an occurrence of a reassignment of a work unit record from one user to an other user. By way of non-limiting illustration, the first trigger event may be associated with the first change. That is, the first trigger event may be the fact that the state of completion for the first record has changed, regardless of what it changed to.

In some implementations, individual trigger events may be specified as the individual values of the environment parameters. The changes to specific values (as opposed to the occurrence of the change itself) may be referred to as data state changes. The data state change may refer to a change of a parameter to a specific value from an other value (and/or from a state of being unspecified). For example, a trigger event may include a reassignment of a work unit record from one user to another specific user (e.g., the other specific user being the trigger event). For example, a trigger event may include a comment having one or more specific words and/or phrases (as opposed to an occurrence of the comment being generated). By way of non-limiting illustration, the first trigger event may be associated with the second value and/or other values. That is, the first trigger event may be the state of completion for the first record being "completed."

In some implementations, individual trigger events may be specified relatively and/or based on relations between records. By way of non-limiting illustration, individual records may be related to other records based on one or more of a dependency, a hierarchy, and/or ways that define relationships between records. By way of non-limiting illustration, a set of work unit records may describe tasks which are subtasks to another work unit record describing a "parent" task, within a hierarchy. Accordingly, the set of work units records may be related to the other work unit record via the hierarchy. A trigger event may be specified in context of a relationship. By way of non-limiting illustration, a trigger event may comprise "one (or more) subtasks of the parent task being marked complete." Trigger events may be defined in the context of other relationships between records within the scope of this disclosure.

In some implementations, individual trigger events may be specified in relation to time. For example, certain temporal designations may be placed on trigger events. That is, the values, or change in values defined by a trigger event may have a time restriction or designation placed on it. By way of non-limiting illustration, a trigger event may be associated with a parameter having one or more of a value (or experiencing a value change) by given date and/or time, a value (or experiencing a value change) within a date and/or time range, a value (or experiencing a value change) after a passage of a specified amount of time following some reference point in time, and/or other time-based characteristic. For example, a task may have a due date, and a trigger event could be "if the task is overdue" (meaning the work completion parameter still indicates "incomplete" after a date specified as the due date of the task).

The automation component 110 may be configured to, responsive to detection of the occurrence of the trigger events, determine which of the branching criteria are satisfied. The determination of which branching criteria are satisfied may be based on referencing one or more values of one or more of the environment parameters of one or more records, and/or other information. The determination may be based on monitoring environment state information, user actions at the remotely located client computing platform(s) 104, and/or other components of system 100. In some implementations, automation component 110 may be configured to monitor the environment state information managed by environment state component 108 to identify the values of one or more of the environment parameters. Determining which branching criteria are satisfied may comprise identifying the environment parameter (or parameters) indicated by the source component of a branching criterion, obtaining the value(s) of the environment parameter(s), and comparing the obtained value (or values) to the value (or change in the value) indicated by the satisfaction component of the branching criterion. If the obtained value matches (is the same as or similar to) the value indicated in the satisfaction component, then satisfaction of a branching criterion may be determined. If the obtained value does not match (is not the same as or similar to) the value indicated in the satisfaction component, then non-satisfaction of a branching criterion may be determined. If branching criterion is determined to not be satisfied, the automation scheme may not proceed down that "branch" of the scheme.

By way of non-limiting illustration, the automation component 110 may be configured to, responsive to detection of the occurrence of the first trigger event, determine which of the first branching criterion and/or the second branching criterion are satisfied.

The automation component 110 may be configured to, responsive to the detection of the occurrence of individual trigger events and determination of the satisfaction of the individual ones of the branching criteria, effectuate individual ones of the sets of automated actions within the collaboration environment. By way of non-limiting illustration, responsive to the detection of the first trigger event and satisfaction of the first branching criterion, automation component 110 may be configured to effectuate the first set of automated actions within the collaboration environment. By way of non-limiting illustration, responsive to the detection of first trigger event and satisfaction of the second branching criterion, automation component 110 may be configured to effectuate the second set of automated actions within the collaboration environment. By way of non-limiting illustration, responsive to the detection of first trigger event and satisfaction of both the first branching criterion and the second branching criterion, automation component 110 may be configured to concurrently effectuate the first set of automated actions the second set of automated actions within the collaboration environment.

In some implementations, an individual automated action may include effectuating one or more of creation of, change in, and/or specification of, one or more values of one or more of the environment parameters for one or more records. In some implementations, the creation of, change in, and/or specification of values of environment parameters may be accomplished by accessing a corresponding record (e.g., user record, work unit record, and/or other records). In some implementations, creation of, change in, and/or specification of an individual value may be reflected in views of the collaboration environment accessed by users.

In some implementations, individual automated actions may be classified by with individual action types. An action type may dictate the extent in which an automation action effects the collaboration environment. An action type may include one or more of a record creation type, value specification type, and/or other types. A record creation type automated action may include creating one or more of a user record, work unit record, and/or other records. The creation of a record may include generating an instance of the record in the collaboration environment. In some implementations, creation of the record by a record creation type automated action may not specifically define values of the environment parameters within the record and/or may set values to one or more of default values, null values, and/or other values. In some implementations, creating a work unit record may comprise selecting a work unit template and creating the work unit record from the work unit template. In some implementations, the work unit template may be selected from a repository of multiple work unit templates. The repository of work unit templates may be accessed by users through a user interface of the collaboration environment. A work unit template may include a shell, or outline, of a work unit record where some information may be predetermined, some information may be determined upon implementation of the template, and/or some information may be left blank or null.

A value specification type automated action may include changing, and/or specifying, one or more values of one or more of the environment parameters contained within a record. In some implementations, value specification type automated action may further be classified by one or more action subtypes based on the individual values of the individual environment parameters associated with the individual automated actions. An action subtype may include one or more of a time-based subtype, privacy and/or permissions subtype, accessibility subtype, interaction subtype, and/or other subtype.

An automated action of the time-based subtype may effectuate change in, and/or specification of, one or more values of one or more of the environment parameters related to time. For a work unit record, this may include one or more unit of work dates (e.g., a start date, a due date, a completion date, and/or dates). For a user record, this may include one or more of a start of employment date, an end of employment date, a length of employment period, a length of vacation period, and/or other information.

An automated action of the privacy and/or permissions subtype may correspond to values of environment parameters related to privacy and/or permissions. By way of non-limiting illustration, an automated action performed on a user record being of the privacy and/or permissions subtype may include change of, and/or specification of, one or more of one or more teams a user belongs to, one or more user display settings (e.g., colors, size, project order, task order, other unit of work order, etc.), one or more authorized applications, application access information (e.g., username/password for one or more third-party applications), one or more favorites and/or priorities, and/or other information for the user. By way of non-limiting illustration, an automated action performed on a work unit record being of the privacy and/or permissions subtype may include change of, and/or specification of, one or more of one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters), notification settings, privacy settings, dependencies between one or more work units, and/or other values.

An automated action of the accessibility subtype may correspond to values of environment parameters which may be required in a record (user and/or work unit) in order for the record to take effect within the collaboration environment. Values of environment parameters which may be required in a record in order for the record to take effect may refer to values that, if left undefined, would not provide any meaningful use within the collaboration environment. In other words, the values of environment parameters which may be required in a record in order for the record to take effect may refer to a minimum quantity of environment parameters which may need to be specified in order to allow users to interact with and/or access the record. By way of non-limiting illustration, an automated action performed on a user record being of the accessibility subtype may include change of, and/or specification of, one or more of a user name, a user account, a user role, a user department, descriptive user content, a to-email, a from-email, a photo, an organization, and/or other values. By way of non-limiting illustration, an automated action performed on a work unit record being of the accessibility subtype may include change of, and/or specification of, one or more of a unit of work description, one or more members associated with a unit of work (e.g., an owner, one or more other project/task members, member access information, one or more assignees, and/or other information), an associated URL, and/or other values.

An automated action of the interaction subtype may correspond to values of environment parameters which may be specified in a record (user and/or work unit) in order to provide further functionality and/or accessibility within the collaboration environment. Values of environment parameters which may be specified in a record (user and/or work unit) in order to provide further functionality and/or accessibility may refer to values other than those associated with the time-based subtype, privacy and/or permissions subtype, accessibility subtype, and/or other subtypes.

It is noted that the classification of automated actions into action types and/or subtypes, and/or the descriptions of the different action types and/or subtypes are provided for illustrative purposes only. Instead, it is to be understood that action types and/or subtype may be described in other ways, and/or automated actions may be classified in other ways.

In some implementations, an individual automated action may be carried out simultaneously (or near simultaneously) with an individual detection of an individual occurrence of an individual trigger event and/or determination of satisfaction of branching criterion. In some implementations, an individual automated action may be carried out within a specified time frame following an individual detection of an individual occurrence of an individual trigger event and/or determination of satisfaction of branching criterion. In some implementations, a specified time frame may include a "waiting" period of time before an action is carried out. In some implementations, the waiting period of time may be satisfied by one or more of the passage of the period of time, some other trigger event, some other criterion being satisfied, and/or other events and/or actions within the collaboration environment.

In some implementations, a set of automated actions may be associated with one or more of a sequence in which automated actions in the set are to be carried out, concurrent carrying out of two or more of the automated actions in the set, and/or other features and/or functionality. The automated actions within a set of automated actions may have a specified ordered sequence in which the automated actions are to be carried out. In some implementations, one or more actions may be followed by, and/or preceded by, a specified waiting period. A set of automation actions may specify that two or more actions may be carried out concurrently. In some implementations, a user may specify a combination and/or sequence of multiple triggers and/or multiple automated actions as a multi-step "workflow" that may include branching logic. By way of non-limiting illustration, a chain of trigger/action pairs of a given sequence may result in facilitating a workflow.

It is noted that while some descriptions presented herein may be directed to an individual trigger event and an individual branching criterion causing an individual set of automated actions to be carried out within the collaboration environment, this is for illustrative purposes only and not to be considered limiting. For example, in some implementations, multiple trigger events and multiple branching criterion may be combined together through some logic criteria, that when satisfied, may cause multiple different sets of automated actions to be carried out within the collaboration environment. Logic may include, for example, Boolean logic. By way of non-limiting illustration, logic operators such as "AND", "OR", "NOT", and/or other operations may be utilized to generate more complex trigger/branching criteria combinations for automated actions. In some implementations, the use of logic operators may allow for fewer discrete trigger events to be defined yet still have more complex behavior available to users. For example, there may not need to specify a trigger event of "when task is unassigned", since through the use of a logic operator "NOT", a trigger event may be defined by "when task assigned" combined with the operator "NOT". Further, the Boolean logic may facilitate multistage automation. By way of non-limiting illustration, logic may include one or more of "than-if-then," "if-and-if-then," "if-then-then," "else-if" and/or other operators. In some implementations, a user may specify a set, or pool, of trigger events/branching criteria that lead to one or more sets of automated actions. In some implementations, user may specify that one or more of the trigger events in the set may individually and/or in combination lead to one or more sets of automated actions based on satisfaction of one or more branching criterion. This way, a user may specify multiple options of trigger events/branching criterion which may lead to one or more automated actions.

User interface component 112 may be configured to effectuate presentation of instances of a user interface of the collaboration environment on individual client computing platforms of one or more client computing platforms 104. For example, user interface component 112 may be configured to effectuate communication of user interface information from server(s) 102 to remotely located client computing platform(s) 104 associated with the users over an Internet connection. Receipt of the user interface information by the remotely located client computing platform(s) 104 may cause the remotely located client computing platform(s) 104 to present instances of a user interface of the collaboration environment through which users interact with the collaboration environment.

A user interface of the collaboration environment through which users interact with the collaboration environment may be configured to facilitate user specification of automation records. In some implementations, user interface component 112 may be configured to prevent presentation of a user interface configured to facilitate user specification (and/or modification) of automation records on computing platforms of users who may not be authorized within system 100.

The user interface component 112 may be configured to effectuate presentation of a user interface through which users may specify and/or select one or more of one or more automated actions, one or more trigger events, one or more branching criteria, and/or other information. In some implementations, users may provide entry and/or selection of a period of time or times when an automaton record may be active (e.g., configured to be executed) and/or paused (e.g., configured to not be executed). By way of non-limiting illustration, a user interface element may comprise an "active/paused" toggle button.

A user interface of the collaboration environment may include one or more user interface portions. By way of non-limiting illustration, a user interface may include one or more input portions and/or other components. Individual portions may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

An input portion of a user interface may be configured to obtain user input comprising one or more of user entry and/or selection of environment parameters to carry out actions on, entry and/or selection of values to apply to the entered and/or selected environment parameters, entry and/or selection of environment parameters associated with trigger events, entry and/or selection of values of environment parameters associated with trigger events, and/or other information.

Figure 3:
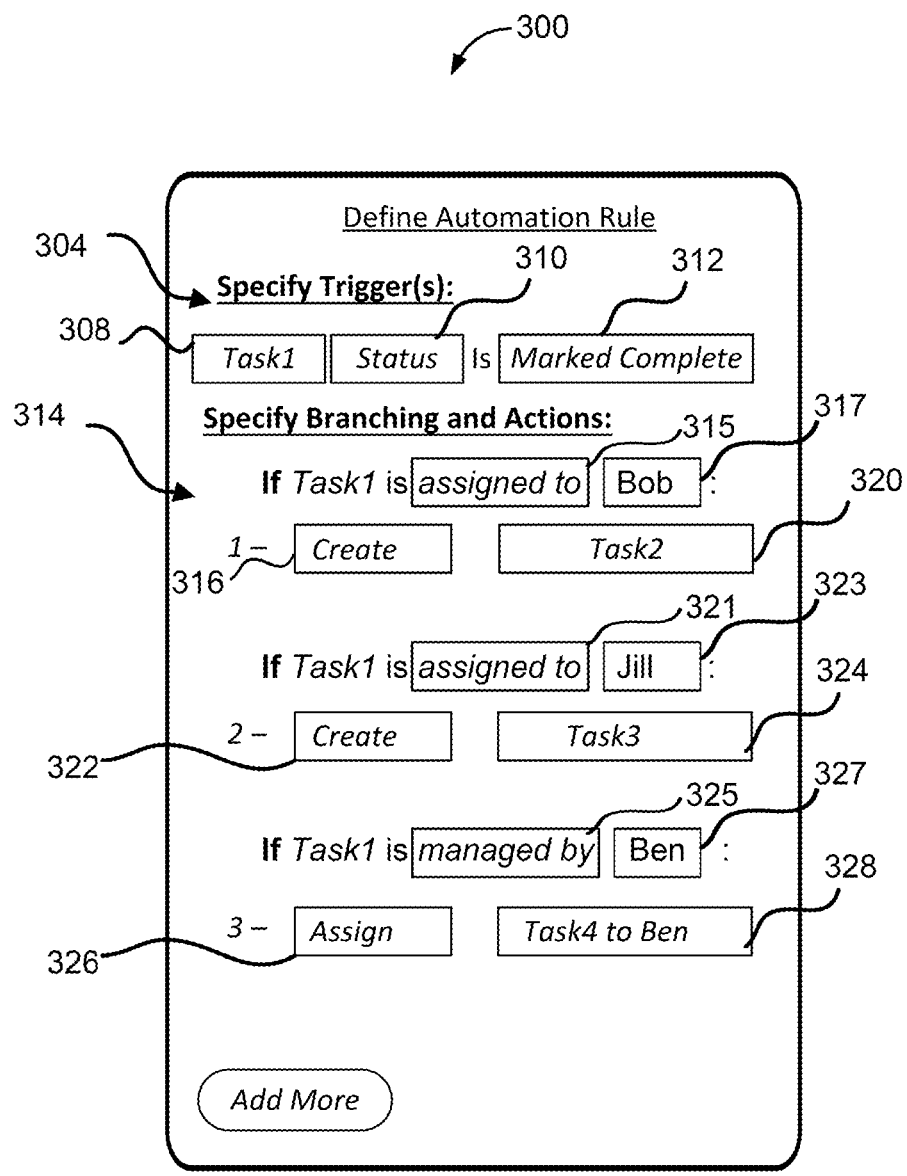
FIG. 3 illustrates an exemplary user interface, in accordance with one or more implementations.

FIG. 3 illustrates an exemplary user interface 300, in accordance with one or more implementations. The user interface 300 may be configured to obtain user entry and/or selection of automation information and/or other information. The user entry and/or selection may be in the form of specification of automated actions, trigger events, branching criteria, and/or other information. Automated actions may be specified based on identification of environment parameters to carry out actions on, specification of values to apply to the identified environment parameters, and/or other information. Trigger events may be specified based on one or more of identification of environment parameters associated with trigger events, specification of values of environment parameters associated with trigger events, and/or other information. Branching criteria may be specified based on one or more of identification of environment parameters associated with trigger events, specification of values of environment parameters that causes satisfaction of the criteria, and/or other information.

The user interface 300 may include a trigger input portion 304 to obtain entry and/or selection of a trigger event. The trigger input portion 304 may include a user interface element 308 configured to obtain information identifying a work unit record associated with the trigger event (called "Task1"), a user interface element 310 configured to obtain entry and/or selection of an environment parameter associated with the trigger event (e.g., work completion parameter), and a user interface element 312 configured to obtain entry and/or selection of a value for the environment parameter associated with the trigger event (e.g., "marked complete"). Stated otherwise, the trigger event in FIG. 3 may refer to the completion status of a task record for a task named "Task1" being "marked complete."

The user interface 300 may include an input portion 314 to obtain entry and/or selection of a set of automated actions and/or branching criteria. The input portion 314 may include a user interface element 315 configured to obtain entry and/or selection of an environment parameter (e.g., assignment parameter) associated with a first branching criterion, and a user interface element 317 configured to obtain entry and/or selection of a value for the environment parameter associated with satisfaction of the branching criterion (e.g., assigned to "Bob"). Stated otherwise, if Task1 is assigned to Bob, then this branching criterion is satisfied and a first automation action may be carried out. The input portion 314 may include a user interface element 316 configured to obtain entry and/or selection of creation request, and a user interface element 320 configured to obtain entry and/or selection of what is being created. For illustrative purposes, the request may be creating a work unit record for a unit of work called "Task2." Accordingly, the first automated action may refer to creating a work unit record for unit of work with the name "Task2" in response to Task1 being assigned to Bob and having been marked complete.

The input portion 314 may include a user interface element 321 configured to obtain entry and/or selection of an environment parameter (e.g., assignment parameter) associated with a second branching criterion, and a user interface element 323 configured to obtain entry and/or selection of a value for the environment parameter associated with satisfaction of the branching criterion (e.g., assigned to "Jill"). Stated otherwise, if Task1 is assigned to Jill, then this branching criterion is satisfied and a second automation action may be carried out. The input portion 314 may include a user interface element 322 configured to obtain entry and/or selection of creation request, and a user interface element 324 configured to obtain entry and/or selection of what is being created. For illustrative purposes, the request may be creating a work unit record for a unit of work called "Task3." Accordingly, the second automated action may refer to creating a work unit record for unit of work with the name "Task3" in response to Task1 being assigned to Jill and having been marked complete.

The input portion 314 may include a user interface element 325 configured to obtain entry and/or selection of an environment parameter (e.g., work management parameter) associated with a third branching criterion, and a user interface element 327 configured to obtain entry and/or selection of a value for the environment parameter associated with satisfaction of the branching criterion (e.g., managed by "Ben"). Stated otherwise, if Task1 is managed by Ben, then this branching criterion is satisfied and a third automation action may be carried out. The input portion 314 may include a user interface element 326 configured to obtain entry and/or selection of an environment parameter (e.g., assignment parameter) associated with the third automation action, and a user interface element 328 configured to obtain entry and/or selection of value(s) for the environment parameter associated with the actions to be automated (e.g., assign "Task4" to "Ben"). Accordingly, the third automated action may refer to assigning a work unit record for unit of work with the name "Task4" to "Ben", in response to Task1 having been marked complete.

It is noted that FIG. 3 is for illustrative purposes only and is not to be considered limiting. Instead, it is to be understood that the user interface 300 may be configured in other ways and/or include other elements in accordance with one or more implementations of the system 100 presented herein.

Returning to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform(s) 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connected to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112 and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
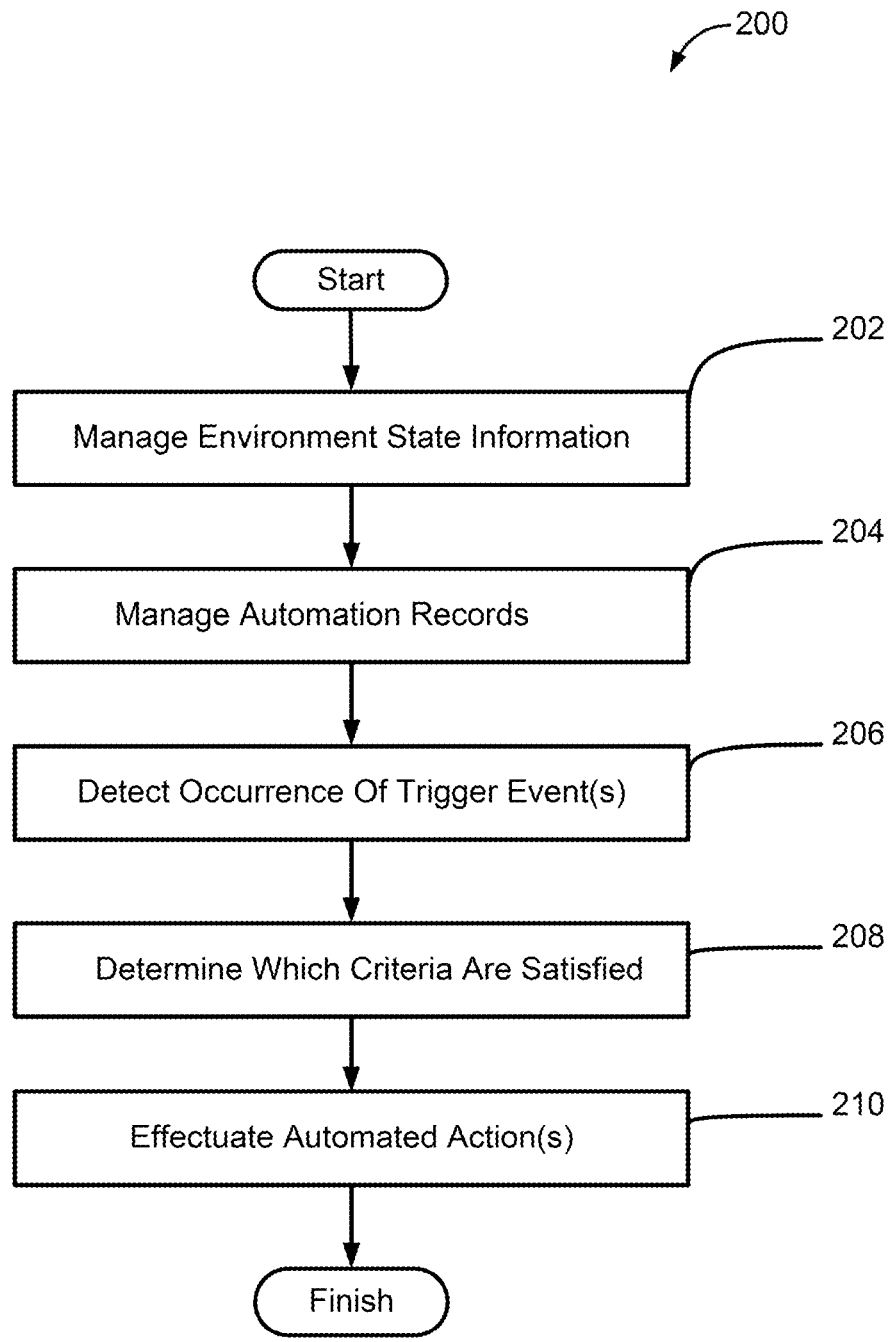
FIG. 2 illustrates a method to execute branching automation schemes in a collaboration environment, in accordance with one or more implementations.

FIG. 2 illustrates a method 200 to execute branching automation schemes in a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment, and/or other information. The collaboration environment may be configured to facilitate interaction by users with the collaboration environment. The environment state information may include one or more records. The one or more records may include user records, work unit records, automation records, and/or other records. The user records may include user information describing the users of the collaboration environment. The work unit records may include work unit information describing units of work managed, and/or assigned within the collaboration environment. Operation 202 may be performed by one or more hardware processors configured by machine-readable instructions including a component that is the same as or similar to environment state component 108, in accordance with one or more implementations.

An operation 204 may manage the automation records of the collaboration environment. The automation records may define one or more of trigger events, branching criteria, sets of automated actions to carry out in the collaboration environment in response to occurrence of the trigger events and satisfaction of individual ones of the branching criteria, and/or other information. By way of non-limiting illustration, the automation records may include a first automation record. The first automation record may define one or more of a first trigger event, a first branching criterion, a first set of automated actions to carry out in the collaboration environment in response to occurrence of the first trigger event and satisfaction of the first branching criterion, a second branching criterion, a second set of automated actions to carry out in the collaboration environment in response to the occurrence of the first trigger event and satisfaction of the second branching criterion, and/or other information. Operation 204 may be performed by one or more hardware processors configured by machine-readable instructions including a component that is the same as or similar to automation component 110, in accordance with one or more implementations.

An operation 206 may detect, based on monitoring the environment state information, occurrence of the trigger events. By way of non-limiting illustration, an occurrence of the first trigger event may be detected. Operation 206 may be performed by one or more hardware processors configured by machine-readable instructions including a component that is the same as or similar to automation component 110, in accordance with one or more implementations.

An operation 208 may determine which of the branching criteria within the automation records are satisfied. Operation 208 may be responsive to detection of the occurrence of the trigger events and/or other information. By way of non-limiting illustration, responsive to detection of the occurrence of the first trigger event, processor(s) may be configured to determine if the first branching criterion, the second branching criterion, and/or other branching criterion of the first automation record are satisfied. Operation 208 may be performed by one or more hardware processors configured by machine-readable instructions including a component that is the same as or similar to automation component 110, in accordance with one or more implementations.

An operation 210 may effectuate individual ones of the sets of automated actions within the collaboration environment. Operation 210 may be responsive to one or more of the detection of the occurrence of individual trigger events, the satisfaction of the individual ones of the branching criteria, and/or other events, actions, information, and/or determinations. By way of non-limiting illustration, responsive to the detection of the first trigger event and satisfaction of the first branching criterion, the processor(s) may be configured to effectuate the first set of automated actions within the collaboration environment. By way of non-limiting illustration, responsive to the detection of first trigger event and satisfaction of the second branching criterion, the processor(s) may be configured to effectuate the second set of automated actions within the collaboration environment. By way of non-limiting illustration, responsive to the detection of first trigger event and satisfaction of both the first branching criterion and the second branching criterion, the processor(s) may be configured to concurrently effectuate the first set of automated actions the second set of automated actions within the collaboration environment. Operation 210 may be performed by one or more hardware processors configured by machine-readable instructions including a component that is the same as or similar to automation component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to execute branching automation schemes in a collaboration environment, the system comprising:
   one or more physical processors configured by machine-readable instructions to:
      manage, by a server, environment state information maintaining a collaboration environment, the collaboration environment being configured to facilitate interaction by users with the collaboration environment, the users interacting with the collaboration environment through remotely located client computing platforms communicating with the server over one or more network connections, the environment state information including work unit records, the work unit records including work unit information describing units of work managed and/or assigned within the collaboration environment;
      manage, by the server, an automation record, the automation record defining:
      a trigger event;
      a first branching criterion;
      a first set of automated actions to carry out in the collaboration environment in response to an occurrence of the trigger event and satisfaction of the first branching criterion;
      a second branching criterion; and
      a second set of automated actions to carry out in the collaboration environment in response to the occurrence of the trigger event and satisfaction of the second branching criterion;

establish the one or more network connections between the remotely located client computing platforms and the server;

monitor, by the server, the environment state information to detect changes in the environment state information resulting from the interaction by the users with the collaboration environment through instances of a user interface of the collaboration environment presented by the remotely located client computing platforms communicating with the server over the one or more network connections;

detect, by the server and based on monitoring the environment state information, a first occurrence of the trigger event;

responsive to detection of the first occurrence of the trigger event, determine if the first branching criterion and/or the second branching criterion are satisfied;

responsive to the satisfaction of the first branching criterion, effectuate the first set of automated actions within the collaboration environment;

responsive to the satisfaction of the second branching criterion, effectuate the second set of automated actions within the collaboration environment; and responsive to satisfaction of both the first branching criterion and the second branching criterion, concurrently effectuate the first set of automated actions and the second set of automated actions within the collaboration environment.

2. The system of claim 1, wherein the one or more physical processors are further configured by the machine-readable instructions to:

effectuate communication of user interface information from the server to the remotely located client computing platforms associated with the users over the one or more network connections, wherein receipt of the user interface information by the remotely located client computing platforms causes the remotely located client computing platforms to present the instances of the user interface of the collaboration environment through which the users interact with the collaboration environment; and define the trigger event based on the changes in the environment state information resulting from the interaction by the users with the collaboration environment.

3. The system of claim 1, wherein the trigger event is derived from user information in one or more user records and/or the work unit information in one or more of the work unit records.

4. The system of claim 1, wherein the first branching criterion is derived from a subset of the work unit information in one or more of the work unit records.

5. The system of claim 4, wherein the subset of the work unit information includes one or more of a user designation, a work type, or a custom field.

6. The system of claim 5, wherein the user designation includes one or more of assignee, owner, creator, or manager.

7. The system of claim 1, wherein an automated action includes effectuating change in, and/or specification of, a subset of the work unit information in one or more of the work unit records.

8. The system of claim 1, wherein the first set of automated actions includes selecting a work unit template and creating a new work unit record from the work unit template.

9. The system of claim 8, wherein the work unit template is selected from a repository of multiple work unit templates.

10. The system of claim 1, wherein an automated action is carried out after a specified time frame following a determination of the satisfaction of the first branching criterion and/or the second branching criterion.

11. A method to execute branching automation schemes in a collaboration environment, the method being implemented in a computer system comprising one or more physical processors an by machine-readable instructions, the method comprising:

managing, by a server, environment state information maintaining a collaboration environment, the collaboration environment being configured to facilitate interaction by users with the collaboration environment, the users interacting with the collaboration environment through remotely located client computing platforms communicating with the server over one or more network connections, the environment state information including work unit records, the work unit records including work unit information describing units of work managed and/or assigned within the collaboration environment;

managing, by the server, an automation record, the automation record defining:
 a trigger event;
 a first branching criterion;
 a first set of automated actions to carry out in the collaboration environment in response to an occurrence of the trigger event and satisfaction of the first branching criterion;
 a second branching criterion; and
 a second set of automated actions to carry out in the collaboration environment in response to the occurrence of the trigger event and satisfaction of the second branching criterion;

establishing the one or more network connections between the remotely located client computing platforms and the server;

monitoring, by the server, the environment state information to detect changes in the environment state information resulting from the interaction by the users with the collaboration environment through instances of a user interface of the collaboration environment presented by the remotely located client computing platforms communicating with the server over the one or more network connections;

detecting, by the server and based on the monitoring the environment state information, a first occurrence of the trigger event;

responsive to detection of the first occurrence of the trigger event, determining if the first branching criterion and/or the second branching criterion are satisfied;

responsive to the satisfaction of the first branching criterion, effectuating the first set of automated actions within the collaboration environment;

responsive to the satisfaction of the second branching criterion, effectuating the second set of automated actions within the collaboration environment; and responsive to satisfaction of both the first branching criterion and the second branching criterion, concurrently effectuating the first set of automated actions and the second set of automated actions within the collaboration environment.

12. The method of claim 11, further comprising:

effectuating communication of user interface information from the server to the remotely located client computing platforms associated with the users over the one or more network connections, wherein receipt of the user interface information by the remotely located client computing platforms causes the remotely located client computing platforms to present the instances of the user interface of the collaboration environment through which the users interact with the collaboration environment; and defining the trigger event based on the changes in the environment state information resulting from the interaction by the users with the collaboration environment.

13. The method of claim 11, wherein the trigger event is derived from user information in one or more user records and/or the work unit information in one or more of the work unit records.

14. The method of claim 11, wherein the first branching criterion is derived from a subset of the work unit information in one or more of the work unit records.

15. The method of claim 14, wherein the subset of the work unit information includes one or more of a user designation, a work type, or a custom field.

16. The method of claim 15, wherein the user designation includes one or more of assignee, owner, creator, or manager.

17. The method of claim 11, wherein an automated action includes effectuating change in, and/or specification of, a subset of the work unit information in one or more of the work unit records.

18. The method of claim 11, wherein the first set of automated actions includes selecting a work unit template and creating a new work unit record from the work unit template.

19. The method of claim 18, wherein the work unit template is selected from a repository of multiple work unit templates.

20. The method of claim 11, wherein an automated action is carried out after a specified time frame following a determination of the satisfaction of the first branching criterion and/or the second branching criterion.

* * * * *

UNITED STATES PATENT AND TRADEMARK OFFICE
CERTIFICATE OF CORRECTION

| | | |
|---|---|---|
| PATENT NO. | : 12,155,702 B2 | Page 1 of 1 |
| APPLICATION NO. | : 18/511219 | |
| DATED | : November 26, 2024 | |
| INVENTOR(S) | : Victoria Ye et al. | |

It is certified that error appears in the above-identified patent and that said Letters Patent is hereby corrected as shown below:

In the Claims

In Claim 11 Column 28, Line 8, please delete "an" and insert --configured-- between "processors" and "by", therefor.

Signed and Sealed this
Twenty-eighth Day of January, 2025

Coke Morgan Stewart
*Acting Director of the United States Patent and Trademark Office*